March 31, 1964 A. T. HINMAN 3,126,885
BLOOD PRESSURE MEASURING DEVICE
Filed May 18, 1961 5 Sheets-Sheet 1

ALLEN T. HINMAN
INVENTOR.

BY Soans, Anderson,
Luedeka & Fitch
ATTORNEYS

FIG_2

FIG. 6

ALLEN T. HINMAN
INVENTOR.

United States Patent Office 3,126,885
Patented Mar. 31, 1964

3,126,885
BLOOD PRESSURE MEASURING DEVICE
Allen T. Hinman, Ross, Calif., assignor to The Hypertension Research Foundation, San Francisco, Calif., a non-profit corporation of California
Filed May 18, 1961, Ser. No. 110,959
5 Claims. (Cl. 128—2.05)

The present invention relates generally to a device for measuring blood pressures and more particularly to a portable device for automatically measuring and recording blood pressures.

This application is a continuation-in-part of applicant's co-pending application Serial No. 20,091 which was filed April 5, 1960, and subsequently abandoned by applicant.

It is well known that the usual blood pressure measurements of a patient taken by a physician may be misleading. The inherent minor fluctuations of an individual's blood pressure, plus the variable response of the blood pressure to emotional and physical stress make it very difficult for the physician to obtain a correct picture of a patient's blood pressure. Knowledge of the blood pressure responses to daily activities would clearly assist the physician in the diagnosis and management of high blood pressure.

Numerous devices have been developed heretofore in an attempt to provide a simple yet reliable unit for accurately accomplishing blood pressure measurements. Included among these devices are conventional sphygmomanometers with which a physician, technician or other skilled individual determines blood pressure readings from a column of mercury as pneumatic presure within a cuff strapped to the limb of a subject is allowed to decrease at a slow and preferably steady rate by means of a valve. Utilizing a stethoscope, the skilled individual notes when the cuff pressures passes through the systolic and diastolic pressure values. These pressure values are determined from the audio pulses which are picked up by the stethoscope. Generally, such pressure readings are taken as the pneumatic pressure within the cuff is being relieved so that the systolic and diastolic pressure values are observed and recorded in that order. The utilization of such devices is time consuming and requires a high degree of skill to accurately sense and interpret the audible pulses picked up by the stethoscope.

In an attempt to overcome the difficulties encountered through the use of conventional sphygmomanometers, various more complex devices have been developed. However, these so-called improved blood pressure measuring devices have not satisfactorily resolved the problems incident to obtaining accurate blood pressure measurements. For example, rather than relying on the perceptive senses of a skilled technician, various pen-and-drum recording devices or similar visual indicating instruments have been provided. However, these more complex devices have not proven entirely satisfactory and additional problems of calibration have arisen.

It is a prime object of this invention to provide a new and improved blood pressure measuring device.

Another object of this invention is to provide a portable blood pressure measuring device which is lightweight and compact, and which does not require the services of highly skilled personnel during the operation thereof.

Still another object of this invention is to provide a portable blood pressure measuring device which simultaneously measures and records a variable frequency modulated signal representing the pressure being applied to the brachial artery of an individual and the audible brachial pulse beats that are produced when the applied pressure passes through the blood pressure region.

A further object of this invention is to provide a portable blood pressure measuring device which automatically accomplishes the simultaneous measurement and recordation of an individual's blood pressure and which is sufficiently versatile so that it can be accurately calibrated to measure any selected blood pressure range.

Other objects and advantages of the present invention will become apparent from the following detailed description of a preferred embodiment thereof, when considered in conjunction with the accompanying drawings, wherein.

The present invention is directed to a device for automatically measuring an individual's blood pressure. More particularly, the invention disclosed in the drawings relates to a portable blood pressure measuring device which can be operated solely by a patient and is capable of automatically accomplishing accurate basal pressure measurements. In addition the portable device effects the recordation of the measured systolic and diastolic pressure values on a magnetic tape, thereby permitting the subsequent reproduction and analysis thereof by a physician.

As contemplated by the invention, the blood pressure measuring device comprises means for selectively applying pressure to a selected artery of the individual which is greater than the systolic pressure value and which temporarily collapses the artery and occludes the flow of blood therein. Additional means are provided which are connected to the pressure applying means for gradually reducing the pressure applied to the artery to a pressure below the diastolic blood pressure value. Means are also provided which are responsive to variation in the pressure applied to the artery for translating the pressure variation into a variation of an electrical characteristic.

The device further includes means which are responsive to the variation of the electrical characteristic for generating a frequency modulated signal having a frequency that varies in accordance with the variation in the pressure applied to the artery, each frequency of the frequency modulated signal representing a preselected blood pressure value. In addition, means are provided which are responsive to each of a plurality of pressure pulses occurring at the artery between the systolic and diastolic pressure values for generating a signal in timed relation thereto. Finally, recording means are provided along with means for transmitting the frequency modulated signal and the individual pressure pulse signals to the recording means for recording the signals on a magnetic tape whereby the magnetic tape contains a record of both the systolic and diastolic blood pressure values as represented by the frequency of the frequency modulated signal at the time the pressure pulse signals are initiated and terminated.

Figure 1:
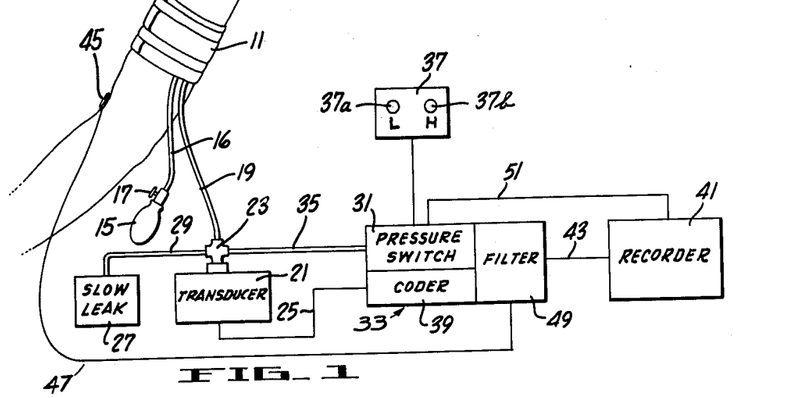
FIGURE 1 is a block diagrammatic representation of a preferred embodiment of a portable blood pressure measuring device in accordance with the present invention during utilization by a patient.

FIGURE 1 discloses a diagrammatic representation of one embodiment of the pressure measuring device as affixed to a patient for self-operation. A pressure cuff 11 is shown wrapped about the patient's upper arm 13. The cuff 11 is utilized to cut off or occlude the flow of blood through the brachial artery and is preferably of a conventional type having an internal air bag and a pressure bulb 15 connected thereto through a tube 16. The pressure bulb 15 is provided with a release valve 17 for effecting the rapid release of pressure within the cuff after the desired pressure readings are taken. An additional tube 19 extends from the air bag within the cuff 11 and communicates with a pressure transducer 21 through a conventional four-way connection 23. The pressure transducer 21 serves to translate variations in pressure applied through the tube 19 to variations in an electrical characteristic. The pressure transducer may be of any suitable type wherein the variation in pressure may be translated to a resistance, voltage or current variation. In a preferred embodiment of the invention a variation in resistance is utilized; however various other types of pressure transducers could be utilized with corresponding variations in the circuitry hereinafter described.

A slow leak device 27 is also connected to the coupling 23 through a tube 29. The slow leak serves to deflate the cuff 11 in a uniform manner after it has been inflated by the air bulb 15 to a pressure value above the systolic pressure of the individual. The gradual leak causes the pressure in the cuff to decrease through the pulse pressure region so that measurements of diastolic and systolic pressure values can be effected.

The fourth opening of the connector 23 is coupled to a switch portion 31 of a coder assembly 33, through a tube 35. The switch is pressure operated and can be adjusted for high (above systolic) and low (below diastolic) pressure values during calibration as hereinafter described. At the low value of pressure, the switch is utilized to actuate the apparatus so that a coder section 39 and recorder 41 are rendered effective. At the high value of the pressure, a signal is employed whereby the patient is apprised that sufficient pressure has been built up in the cuff to collapse the artery and can discontinue the inflation thereof. To this end, signal lights 37 are coupled to the pressure switch for indication of the low and high pressure values.

The output of the pressure transducer 21 is applied to the coder section or frequency modulated circuit 39 of the coder assembly 33 through the conductor 25. The frequency modulating circuit or coder serves not only to transmit the transduced signal to the recorder but also provides significant coding impulses thereon. To this end, the coder translates the variable resistance of the transducer 21 to variations in frequency and feeds the frequency modulated signal to the recorder 41 through a filter section 49 and a conductor 43. The frequency variations in the signal fed from the coder assembly may be either continuous or discontinuous.

Figure 2:
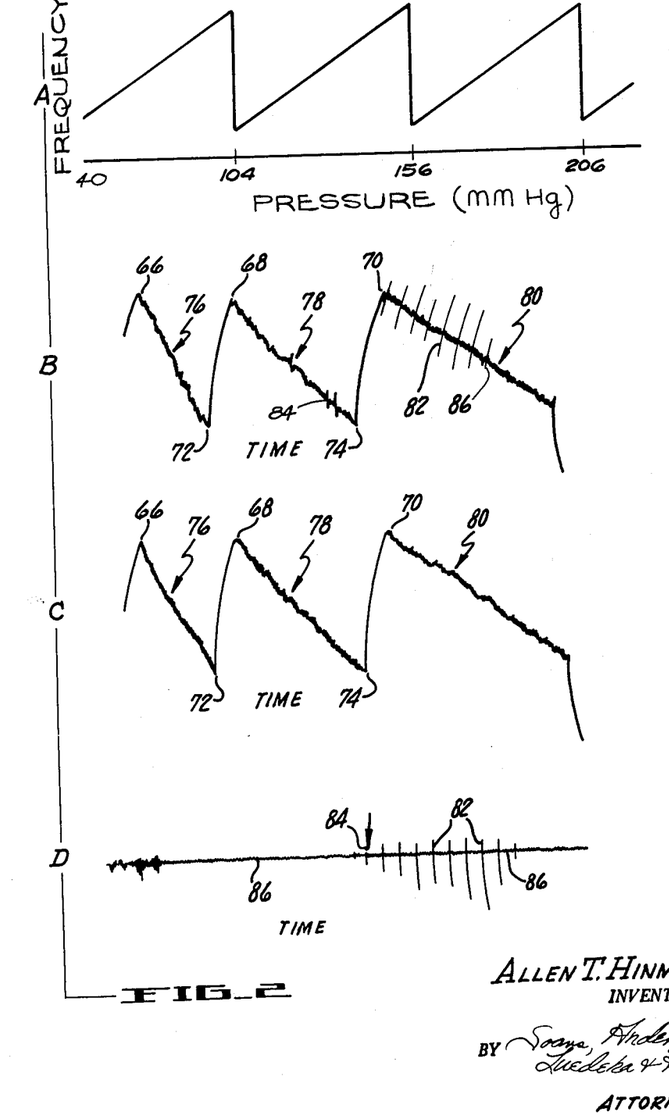
FIGURE 2 graphically depicts a plurality of waveforms which represent the variable frequency modulated signal and audible brachial pulses measured and recorded by the device illustrated in FIGURE 1.

As shown in FIGURE 2A, variations in frequency of a discontinuous frequency modulated signal increase from a low pressure of about 40 millimeters of mercury to a higher pressure such as 104 millimeters of mercury. At this point a further increase of pressure instantaneously decreases the coded frequency and the frequency subsequently increases until a next higher reference point such as 156 millimeters of mercury is obtained. At this point the frequency again drops and the ascent is repeated. Consequently, definite reference points are available at the discontinuities, which in the illustrated example are designated with values of 104, 156, and 206 millimeters of mercury. It is apparent that more or fewer reference points can be selected and utilized if desired.

In addition to the pressure cuff 11, an audio transducer 45 is affixed to the patient's arm and is placed over the brachial artery. When audible brachial pulse sounds are produced, the transducer receives and transmits the pulses through a conductor 47 to the filter section 49 of the coder assembly 33. After being filtered, the pulse signals are passed to the recorder 41 through the conductor 43 along with the filtered coded pressure signals from the frequency modulating circuit 39. However, such audible brachial pulses are only produced when the pressure applied to the brachial artery by the cuff 11 is less than the systolic pressure value and greater than the diastolic pressure value.

The recorder 41, whereto the signals are simultaneously transmitted, is preferably of the miniature magnetic tape type which can be readily carried by the patient and can be either of the single or multiple channel type. When utilizing a dual channel recorder 41 one channel may be used to record the systolic and diastolic pressure values, as represented by the frequency modulated signal fed from the coder assembly 33 while the other channel can be used to maintain a time log of the readings. To accomplish this latter operation a small clock system (not shown) can be utilized. In the embodiment illustrated in FIGURE 1, the recorder is rendered effective and turned off by the pressure switch section 31 of the coder assembly through a conductor 51.

Before using the blood pressure recorder, it is desirous, due to possible variations in circuit components, to calibrate the system. This is accomplished by the arrangement of components illustrated in FIGURE 3, wherein components which are similar to the components shown in FIGURE 1 are indicated by like reference numerals. A wye connection 61 is inserted in the line 19 extending from the cuff 11 and a tube 63 is connected from the wye to a mercury manometer 65. Thus the system is calibrated against the mercury manometer. The output of the coder assembly is applied directly to a readout device 53 which in turn is connected to an indicator 57. It may be noted that during calibration it is not necessary to utilize the audio transducer 45 since the audible pulse signals obtained therefrom are substantially insensitive to circuit changes.

Figure 3:
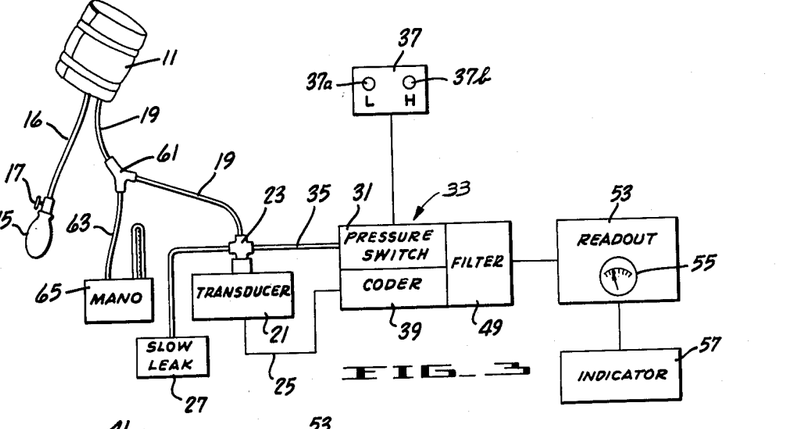
FIGURE 3 is a block diagrammatic illustration of a portable blood pressure measuring device similar to that illustrated in FIGURE 2 with associated calibration apparatus.

The procedure for calibration is somewhat similar to that for taking actual pressure readings. The cuff 11 is inflated and variations in the pressure are measured or read from the readout indicator 55 as well as from the manometer 65. As previously explained, the coder preferably produces a discontinuous frequency modulated signal so that a simplified calibration is accomplished by merely measuring the pressure at selected discontinuities. The various pressures between the discontinuities can be readily and accurately determined by interpolation. Additionally, the manometer 65 is utilized to accurately calibrate the switch 31 to insure proper activation thereof at the desired high (above systolic) and low (below diastolic) pressure values.

In operation, the pressure bulb 15 associated with the air cuff 11 is manually actuated until sufficient pressure is established in the cuff so as to temporarily block the passage of blood through the brachial artery.

As the pressure increases to the low value previously set by the physician during calibration, the low signal light 37a will be illuminated and the recorder as well as the remainder of the circuitry will be turned on by the pressure switch 31. Upon additional application of pressure to the cuff 11, the high limit previously set by the physician will be attained, and the pressure switch will indicate the same by illumination of the "high" light 37b.

The pressure in the cuff is thereafter relieved by the slow leak device 27 which allows a uniform and gradual reduction of cuff pressure through the "pulse pressure" region. The pressure transducer 21, which is responsive to the pressure variations within the cuff 11 during the gradual reduction thereof, translates these pressure variations into a corresponding variation in resistance. The variation in resistance is utilized in the coding of frequency modulating circuit 39 to effect the production of a frequency modulated signal which is transmitted through the filter 49 and recorded by the recorder 41.

During the initial phase of the gradual cuff pressure reduction (which pressure is originally sufficiently high so as to collapse the brachial artery and temporarily occlude blood flow therein), the audio transducer 45 will not receive any audible brachial pulses. However, after the pressure has been lowered to just below the systolic pressure value, audible brachial pulses will be received. At this point, pressure in the cuff 11 will be just below the requisite pressure value needed to maintain the artery in a collapsed state throughout the cardiac cycle. This value is a measure of the blood pressure existing within the artery at the peak of the cardiac cycle.

Additional reduction in the applied pressure will result in the resumption of blood flow through the brachial artery for greater portions of the cardiac cycle. This blood flow against the pressure applied by the cuff produces audible brachial pulses which are picked up by the audio transducer 45 and fed through the filter circuit 49 for simultaneous recording with the frequency modulated signal developed by the coding or frequency modulating circuit 39. These audible brachial pulses will be detected until just after the diastolic pressure value has been reached as the pressure within the cuff is continually and uniformly reduced. This pressure value is just below the magnitude of pressure that is required to maintain the artery in a collapsed state at the minimum pressure point of the cardiac cycle. When this point has been reached, the artery will no longer collapse and no further audible signals corresponding to the opening of the artery against the pressure of the cuff will be picked up by the transducer 45.

Accordingly, by correlating the initiation and termination of the audible brachial pulses to that portion of the frequency modulated signal which is simultaneously recorded therewith, an accurate determination as to the specific systolic and diastolic pressure values can be obtained. These accurate pressure measurements will be derived directly from the measured frequencies at which the pulses begin and terminate. As previously described, these frequencies represent a particular pressure value in accordance with the aforedescribed precalibration of the associated circuitry.

Figure 4:
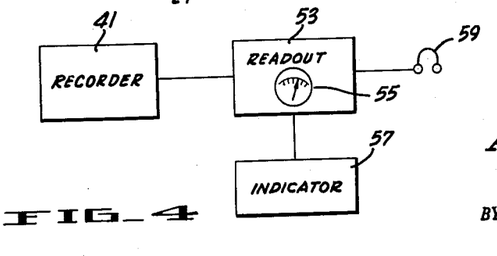
FIGURE 4 is a block diagram illustrating the apparatus utilized to translate the pre-recorded blood pressure measurements accomplished by the device illustrated in FIGURE 1 into useable information.

In order for the physician to determine the actual systolic and diastolic pressure values, the tape on which the blood pressure measurements are recorded is played back on the same recorder or, if desired, on a similar but different recorder. As indicated in FIGURE 4, this determination is made by applying the output of the recorder to the readout device 53 which has an indicating scale 55. The readout device serves to separate the coded pressure signal from the audio signals which represent the brachial pulse beats. Additionally, the readout serves to transform the frequency variations of the frequency modulated signal into voltage or current variations. The pulses can be heard through ear phone 59 and the pressure can be read simultaneously from a meter 55 calibrated in units of pressure. Alternately, the information from the readout 53 can be translated to a permanent visual form by the indicator 57 a.g. a pen and ink recorder.

An example of a typical reading which can be recorded by a pen and ink recorder or other suitable indicating device 57 is shown in FIGURES 2B, 2C and 2D. The abscissa in each case is a function of time while the ordinate is a function of pressure and/or audible sound volume.

FIGURE 2B represents a discontinuous composite signal wherein both the pressure applied at the cuff and the audible pulse beats at the brachial artery are represented by a single trace. As previously explained, peaks 66, 68 and 70 of the overall trace are determined by calibration and, for the present example, represent pressure of 206, 156 and 104 millimeters of mercury respectively. Valleys 72 and 74 of the trace have values corresponding to the associated peak values 68 and 70 respectively. The pressure values at any point along gradual slopes 76, 78 and 80 of the trace are readily determined by interpolation.

Representative spikes 82 of the brachial pulse beats are superimposed on the trace so that the systolic and diastolic pressures can be determined by inspection. The systolic pressure is signified by the beginning of the brachial pulses 82 as at 84, while the diastolic pressure is shown by the end of the pulses 82 as at 86. The points 84 and 86 are used as interpolation points on the slopes 78 and 80 to determine the actual pressures.

FIGURES 2C and 2D are similar to FIGURES 2B; however in these figures the variable frequency signal representing the cuff pressure is recorded by a separate trace (FIGURE 2C) from the brachial pulse beats (FIGURE 2D). The same method is employed as with the recording shown in FIGURE 2B. Although after the systolic and diastolic pressures are located on the trace illustrated in FIGURE 2D, the points must be referred to the trace in FIGURE 2C to determine the actual pressure values.

Figure 7:
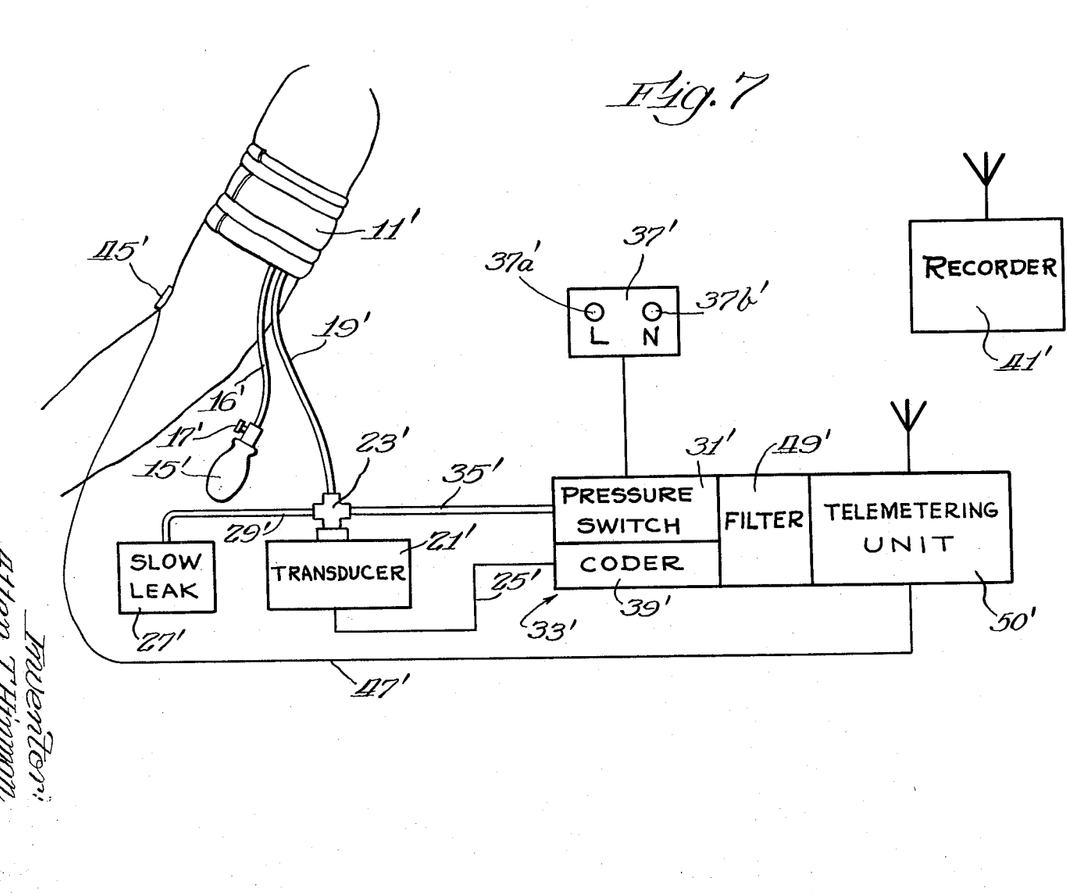
FIGURE 7 is a diagrammatic representation of an alternate embodiment of a portable blood pressure measuring device contemplated by the present invention.

An alternate embodiment of the pressure measuring and recording device is illustrated in FIGURE 7. This alternate embodiment is functionally similar to the device illustrated in FIGURE 1 and incorporates certain common structural and circuit components which are designated by like but primed reference numerals. The primary distinction between the portable blood pressure measuring device illustrated in FIGURE 7 and the aforedescribed embodiment is that the device illustrated in FIGURE 7 incorporates telemetering circuitry whereby the frequency modulated signal and the audible brachial pulses are transmitted from the coder assembly to a recorder which is physically separated from the measuring apparatus.

Referring to FIGURE 7, a pressure bulb 15' is utilized to establish sufficient pressure within the cuff 11' so that the blood flow through the brachial artery is temporarily occluded. As described in conjunction with the previous embodiment, a pressure transducer 21' functions to render the associated circuit components of a coder assembly 33' effective so that the generation of a frequency modulated signal representing a range of pressure values is generated while audible brachial pulses are simultaneously picked up by a transducer 45'.

The generated frequency modulated signal and the audible brachial pulses are fed to a telemetering unit 50' from a suitable filter network 49'. In a conventional manner, the frequency modulated signal and brachial pulses are simultaneously transmitted to a recorder 41'. The telemetering unit 50' might be any one of several commercially available types; however the unit is preferably chosen to effect the simultaneous transmission of the frequency modulated signal and the audible brachial pulses. The location of the recorder 41' relative to the position of the measuring apparatus and telemetering circuitry will depend upon the power output of the latter.

Inasmuch as the coding or frequency modulating circuitry translates variations in cuff pressure into an easily calibrated variable frequency signal, the utilization of a telemetering circuit is particularly suitable for the present application. This "radio-link" feature renders the pressure measuring device substantially more versatile and manifests the ease with which accurate pressure measurements can be transmitted to a recording medium in anticipation of the subsequent reproduction thereof.

Figure 5:
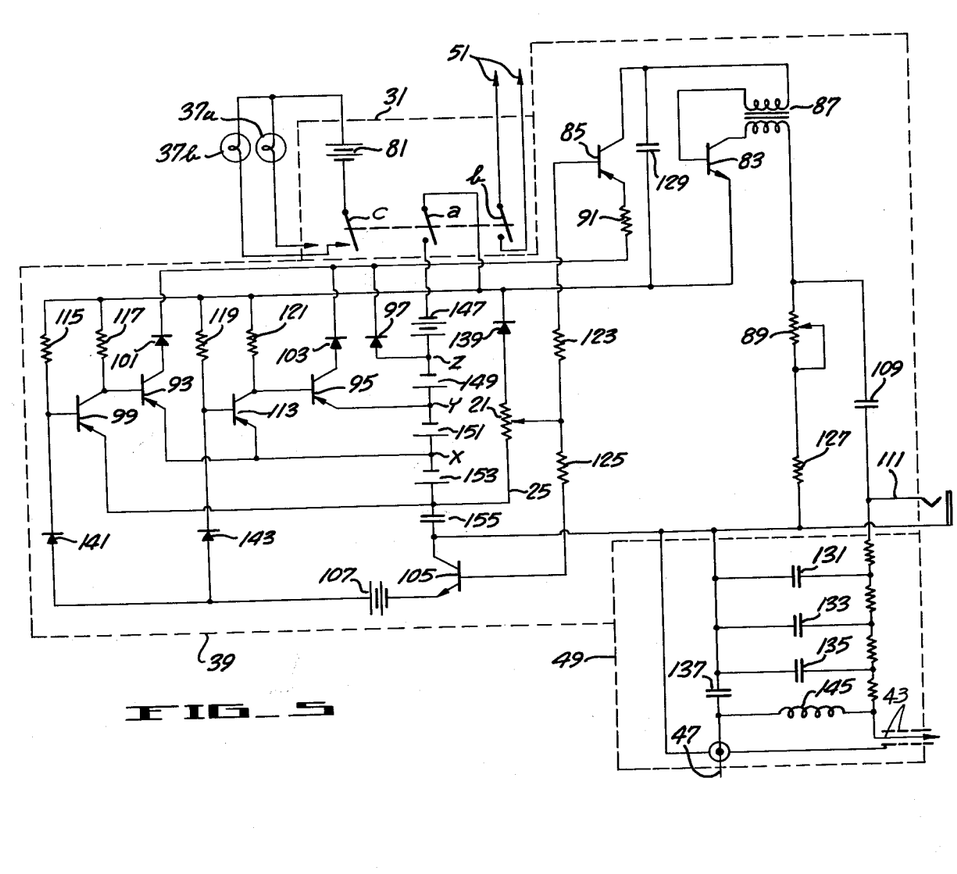
FIGURE 5 is a schematic illustration of coding or frequency modulating circuit of the type incorporated in a preferred embodiment of the blood pressure measuring device shown in FIGURE 1.

A schematic representation of a preferred type of coder assembly 33, which is structurally and functionally identical to the coder assembly 33', is shown in FIGURE 5, wherein like reference numerals are used for corresponding parts disclosed in FIGURES 1 and 7. As illustrated, the coder assembly comprises three main parts, the pressure switch 31, the coding or frequency modulating circuit 39 and the filter circuit 49. The pressure switch 31 includes ganged switch elements *a*, *b* and *c*. The element *a* serves to activate the coder assembly itself, while the element *b* serves to activate an external circuit such as the recorder 41 of FIGURE 1. The element *c* serves to activate either of the lights 37*a* or 37*b* through the battery 81.

The coder assembly also includes an oscillator circuit that includes transistors 83 and 85 and a feedback transformer 87. The output frequency of the oscillator circuit can be adjusted by varying a resistor 89 or by varying the voltage across the base-emitter junction of the transistor 85 and a resistor 91.

Transistors 93 and 95 and a diode 97 serve to alternately supply the emitter current for the transistor 85. It should be noted that each of the transistors 93 and 95 and the diode 97 are supplied from different voltage levels or taps *x*, *y* and *z*, being of increasing negative value, respectively.

At quiescent conditions, the transistor 93 is conducting thereby reverse biasing diodes 97 and 103. Transistors 99 and 113 are maintained in a nonconductive state by the positive potential supplied to the bases thereof from a battery 107 through diodes 141 and 143, respectively. An increase of pressure in the cuff 11 causes the wiper of the transducer 21 to advance upward as viewed in FIGURE 5, thus increasing the forward bias on the transistor 85 and the reverse bias on transistor 105. The increased forward bias of the transistor 85 causes additional current to flow therethrough and, consequently, effects an increase in the frequency of the oscillator circuit. As illustrated, the emitter of the transitor 105 is serially connected to the battery 107 so that the emitter output of the transistor 105 is displaced by the battery voltage.

When reverse bias is applied to the transistor 105, the displaced voltage through the battery 107 becomes equal to or slightly more negative than the emitter voltage of the transistor 99. Consequently, the transistor 99 begins to conduct and the transistor 93 is momentarily cutoff thereby releasing the reverse bias on the diodes 97 and 103. Since the emitter of the transistor 95 is more positive than the anode of the diode 97, the transistor 95 begins to conduct causing back bias on the diode 101 and again on the diode 97. Inasmuch as lower potential is applied to the emitter of the transistor 95 than is applied to the corresponding electrode of transistor 93, less current flows through the emitter resistor 91 of the transistor 85 while the transistor 95 is conducting. With less current applied to the transistor 85, the frequency of the oscillator decreases.

Thus it is seen that as pressure is increased at the transducer 21, the frequency of the oscillator increases until at a predetermined point, the frequency abruptly decreases. Upon additional increase in the pressure, the frequency again increases thereby repeating the cycle. As illustrated, the oscillator is coupled to the line 43 through a capacitor 109 as well as to a calibration jack 111.

The foregoing is descriptive of but one form of a coding or frequency modulating circuit which could be suitably adapted for use in either of the embodiments of the pressure measuring device. However, when utilized with the embodiment incorporating the "radio-link" feature, the output from the filter circuit would be fed to a suitable transmitter (not shown) and thereafter would be telemetered to the recorder 41'. A specific embodiment of the circuitry illustrated in FIGURE 5 might include the following components:

Batteries

| | | |
|---|---|---|
| 81 | Dependent on bulbs 37*a* and 37*b* | |
| 107 | volts | 4 |
| 147 | do | 6 |
| 149 | do | 1.5 |
| 151 | do | 1.5 |
| 153 | do | 1.5 |
| 155 | do | 1.5 |

Transistors

| | |
|---|---|
| 83, 105 | 2N 35 |
| 85 | 2N 34 |
| 93, 95, 99, 113 | 2N 583 |

Diodes

| | |
|---|---|
| 97, 101, 103, 141, 143 | 1N 34 |
| 139 | DR 435 |

Inductance

| | | |
|---|---|---|
| 145 | h | 1.25 |

Resistors

| | | |
|---|---|---|
| 89 | ohms | 1K |
| 91 | do | 4.7K |
| 115 | do | 39K |
| 117 | do | 18K |
| 119 | do | 22K |
| 125 | do | 4.7K |
| 127 | do | 1.2K |
| 157 | do | 22K |
| 159 | do | 220K |
| 161 | do | 220K |
| 121 | do | 18K |
| 123 | do | 4.7K |
| 163 | do | 470K |

Capacitors

| | | |
|---|---|---|
| 109 | micromicrofarads | 10 |
| 129 | microfarads | 0.05 |
| 131 | do | 0.001 |
| 133 | micromicrofarads | 100 |
| 135 | do | 100 |
| 137 | microfarads | 0.44 |

Transducer

| | |
|---|---|
| 21 | 3K ohm potentiometer circuit |

Figure 6:
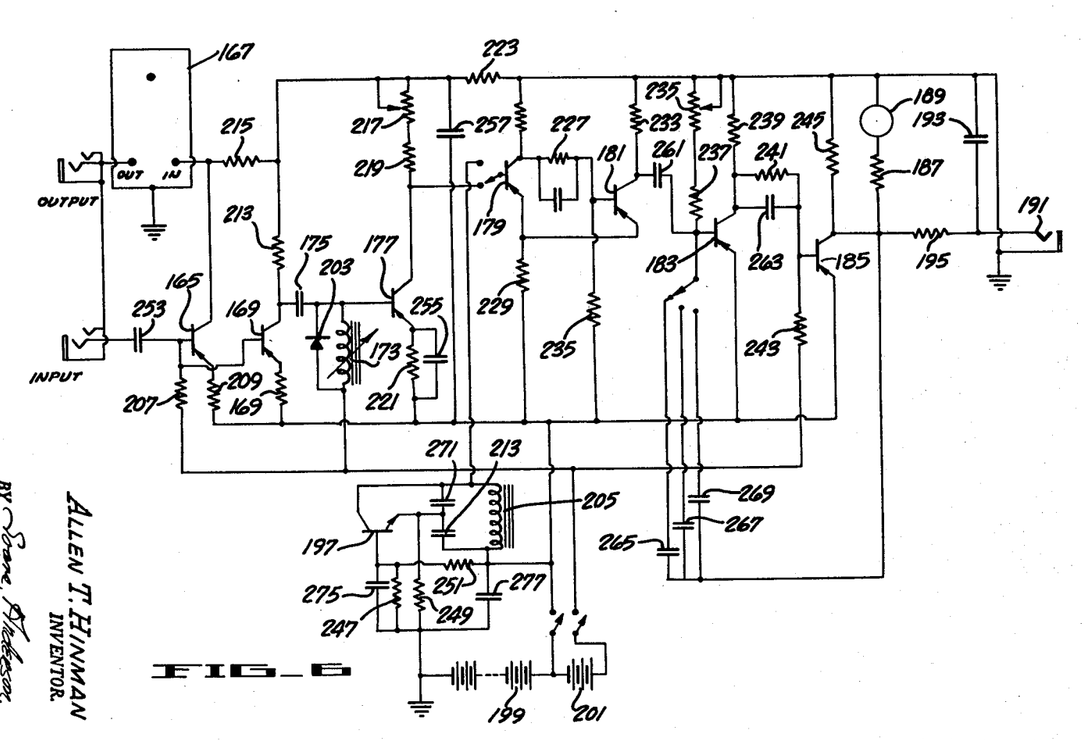
FIGURE 6 is a schematic illustration of the translating circuitry used in a preferred embodiment of the apparatus illustrated in FIGURE 4.

Referring to FIGURE 6, a schematic diagram of a readout circuit suitable for use with either embodiment is shown. As hereinbefore described, the readout serves to separate the audible brachial pulse signals from the pressure representative frequency modulated signal. To this end, the input is applied to a transistor 165 for amplification. The collector current from the transistor 165 is passed through a low pass filter 167 to the audio output. Additionally the signal is applied to a transistor 169. The output of the transistor 169 includes a high frequency pass network including an inductor 173 and a capacitor 175. The output of the high pass network is amplified by a transistor 177 and the amplified high frequency signal is applied to a Schmitt trigger circuit including transistors 179 and 181. The output of the trigger is applied to a monostable multivibrator circuit including transistors 183 and 185. The multivibrator produces an output having constant amplitude and duration and a pulse frequency dependent upon the input frequency from the trigger circuit. A resistor 187 and a meter 189 are connected across the output of the multivibrator and serve to average the pulses. Thus, the meter gives an indication of the frequency in terms of voltage. The output may also be applied to a jack 191 through a filter circuit including a capacitor 193 and a resistor 195.

An oscillator circuit including a transistor 197 is included which may be selectively applied as an input to the Schmitt trigger circuit to provide for the calibration thereof.

A circuit in conformance with the above description might include the following components:

Batteries

| | |
|---|---|
| 199 | 14 volts |
| 201 | 1.5 do |

Transistors

| | |
|---|---|
| 165, 169, 177 | 2N 207 |
| 179, 181, 183, 185 | 2N 583 |
| 197 | 2N 35 |

Diodes

| | |
|---|---|
| 203 | IN 34 |

Filter

| | |
|---|---|
| 167 | UTC-LMI-500 low pass |

Inductors

| | |
|---|---|
| 173 | UTC HVC-7 variable |
| 205 | 0.8 N |

Resistors

| | | |
|---|---|---|
| 187 | ohms | 10K |
| 207 | do | 10K |
| 209 | do | 3.3K |
| 211 | do | 1.8K |
| 213 | do | 3.3K |
| 215 | do | 10K |
| 217 | do | 10K |
| 219 | do | 1.8K |
| 221 | do | 1.8K |
| 223 | do | 220 |
| 225 | do | 1.2K |
| 227 | do | 5.6K |
| 229 | do | 1.2K |
| 231 | do | 5.6K |
| 233 | do | 1.2K |
| 235 | do | 20K |
| 237 | do | 10K |
| 239 | do | 1.2K |
| 241 | do | 3.3K |
| 243 | do | 4.7K |
| 245 | do | 600 |
| 247 | do | 1.8K |
| 249 | do | 10K |
| 251 | do | 39K |

Capacitors

| | | |
|---|---|---|
| 175 | microfarads | 0.002 |
| 193 | do | 1 |
| 253 | do | 50 |
| 255 | do | 0.12 |
| 257 | do | 500 |
| 259 | do | 200 |
| 261 | do | 200 |
| 263 | do | 200 |
| 265 | do | 0.001 |
| 267 | do | 0.002 |
| 269 | do | 0.004 |
| 271 | do | 0.01 |
| 273 | do | 0.5 |
| 275 | do | 50 |
| 277 | do | 500 |

Meter

| | | |
|---|---|---|
| 189 | microamperes | 0–50 |

From the foregoing it is apparent that an improved device has been provided whereby accurate blood pressure measurements can be effected without the services of highly trained personnel. Moreover, the embodiments of the blood pressure measuring device previously described, wherein audible pressure pulses are transmitted simultaneously with a frequency modulated signal representing a range of pressures, can be readily calibrated and provides a convenient means for transmitting blood pressure readings for storage on a medium such as a magnetic tape.

Various modifications in the coding or modulating circuitry as well as in the other components which constitute the portable blood pressure device can be devised by those skilled in the art without departing from the invention as set forth in the following claims.

What is claimed is:

1. A device for automatically measuring an individual's blood pressure and for recording systolic and diastolic blood pressure values, which device comprises means for selectively applying pressure to a selected artery of the individual to temporarily collapse the artery and occlude the flow of blood therein, means connected to said pressure applying means for gradually reducing the pressure applied to the artery to a pressure below the diastolic blood pressure value, means responsive to variation in the pressure applied to the artery for translating the pressure variation into a variation of an electrical characteristic, means responsive to the variation of the electrical characteristic for generating a frequency modulated signal having a frequency which varies in accordance with the variation in the pressure applied to the artery, each frequency of said frequency modulated signal representing a pre-selected blood pressure value, means responsive to each of a plurality of pressure pulses occurring at the artery between the systolic and diastolic pressure values for generating a signal in timed relation thereto, recording means, and means for transmitting said frequency modulated signal and said pressure pulse signals to said recording means for recording both the systolic and diastolic blood pressure values as represented by the frequency of said frequency modulated signal at the time the pressure pulse signals are initiated and terminated.

2. A device for automatically measuring an individual's blood pressure and for recording systolic and diastolic blood pressure values, which device comprises means for selectively applying pressure to a selected artery of the individual to temporarily collapse the artery and occlude the flow of blood therein, means connected to said pressure applying means for gradually reducing the pressure applied to the artery to a pressure below the diastolic blood pressure value, means responsive to variation in the pressure applied to the artery for translating the pressure variation into a variation of an electrical characteristic, means responsive to the variation of the electrical characteristic for generating a frequency modulated signal having a frequency which varies in accordance with the variation in the pressure applied to the artery, each frequency of said frequency modulated signal representing a preselected blood pressure value, means responsive to each of a plurality of pressure pulses occurring at the artery between the systolic and diastolic pressure values for generating a signal in timed relation thereto, recording means, means for filtering said frequency modulated signal and said pressure pulse signals, and means directly connecting said filtering and said recording means so that said frequency modulated signal and said pressure pulse signals are directly fed to said recording means and the systolic and diastolic blood pressure values are recorded thereby, said systolic and diastolic blood pressure values being represented by the frequency of said frequency modulated signal at the time the pressure pulse signals are initiated and terminated.

3. A device for automatically measuring an individual's blood pressure and for recording systolic and diastolic blood pressure values, which device comprises means for selectively applying pressure above the systolic pressure value to a selected artery of the individual to temporarily collapse the artery and occlude the flow of blood therein, means connected to said pressure applying means for gradually reducing the pressure applied to the artery to a pressure below the diastolic blood pressure value, means responsive to variation in the pressure applied to the artery for translating the pressure variation into a variation of an electrical characteristic, means responsive to the variation of the electrical characteristic for generating a frequency modulated signal having a frequency which varies in accordance with the variation in the pressure applied to the artery, each frequency of said frequency modulated signal representing a pre-selected blood pressure value, means responsive to each of a plurality of pressure pulses occurring at the artery between the systolic and diastolic pressure values for generating a signal in timed relation thereto, recording means, means for filtering said frequency modulated signal and said pressure pulse signals, and means for simultaneously telemetering said frequency modulated signal and pressure pulse signals to said recording means for recording both the systolic and diastolic blood pressure values as represented by the frequency of said frequency modulated signal at the time the pressure pulse signals are initiated and terminated.

4. A device for automatically measuring an individual's blood pressure and for recording systolic and diastolic blood pressure values, which device comprises a pressure cuff for selectively applying pressure above the systolic pressure value to a selected artery of the individual to temporarily collapse the artery and occlude the flow of blood therein, a slow leak device connected to said pressure applying means for gradually reducing the pressure applied to the artery to a pressure below the diastolic blood pressure value, a pressure transducer responsive to variation in the pressure applied to the artery for translating the pressure variation into a variation of an electrical characteristic, an oscillator circuit electrically connected to said pressure transducer and responsive to the variation of the electrical characteristic for generating a frequency modulated signal having a frequency which varies in accordance with the variation in the pressure applied to the artery, each frequency of said frequency modulated signal representing a pre-selected blood pressure value, a transducer responsive to each of a plurality of pressure pulses occurring at the artery between the systolic and diastolic pressure values for generating a signal in timed relation thereto, a tape recorder, and means for transmitting said frequency modulated signal and said pressure pulse signals to said tape recorder for recording both the systolic and diastolic blood pressure values as represented by the frequency of said frequency modulated signal at the time the pressure pulse signals are initiated and terminated.

5. A device for automatically measuring an individual's blood pressure and for recording systolic and diastolic blood pressure values, which device comprises means for selectively applying pressure above the systolic pressure value to a selected artery of the individual to temporarily collapse the artery and occlude the flow of blood therein, a slow leak device connected to said pressure applying means for gradually reducing the pressure applied to the artery to a pressure below the diastolic blood pressure value, a pressure transducer responsive to variation in the pressure applied to the artery for translating the pressure variation into a variation in resistance, an oscillator circuit electrically connected to said pressure transducer and responsive to the variation in resistance for generating a frequency modulated signal having a frequency which varies in accordance with the variation in the pressure applied to the artery, each frequency of said frequency modulated signal representing a pre-selected blood pressure value, an audio transducer responsive to each of a plurality of pressure pulses occurring at the artery between the systolic and diastolic pressure values for generating an audio signal in timed relation thereto, a tape recorder, means for filtering said frequency modulated signal and said audio pressure pulse signals, and means for simultaneously telemetering said frequency modulated signal and pressure pulse signals to said tape recorder for recording both the systolic and diastolic blood pressure values as represented by the frequency of said frequency modulated signal at the time the pressure pulse signals are initiated and terminated.

References Cited in the file of this patent

UNITED STATES PATENTS

| | | |
|---|---|---|
| 2,452,799 | Speaker | Nov. 2, 1948 |
| 2,865,365 | Newland | Dec. 23, 1958 |
| 2,946,645 | Schwarzer | July 26, 1960 |
| 3,052,756 | Seven | Sept. 4, 1962 |
| 3,078,841 | Brownson | Feb. 26, 1963 |